(12) United States Patent
Hamon

(10) Patent No.: US 12,459,104 B2
(45) Date of Patent: Nov. 4, 2025

(54) TOOL CART WITH BACKPACK STRAPS AND DOLLY

(71) Applicant: MulePro Industries LLC, Benbrook, TX (US)

(72) Inventor: Richard A. Hamon, Benbrook, TX (US)

(73) Assignee: MulePro Industries, LLC, Benbrook, TX (US)

( * ) Notice: Subject to any disclaimer, the term of this patent is extended or adjusted under 35 U.S.C. 154(b) by 631 days.

(21) Appl. No.: 17/869,625

(22) Filed: Jul. 20, 2022

(65) Prior Publication Data

US 2024/0025028 A1    Jan. 25, 2024

(51) Int. Cl.
*B62B 5/06*      (2006.01)
*B25H 3/02*     (2006.01)
*B62B 5/00*     (2006.01)

(52) U.S. Cl.
CPC .......... *B25H 3/022* (2013.01); *B62B 5/0023* (2013.01); *B62B 5/067* (2013.01)

(58) Field of Classification Search
CPC .......... B25H 3/022; B25H 3/028; B25H 3/06; B62B 5/0023; B62B 5/067; B62B 1/14; B62B 1/26; B62B 2202/48; B62B 2205/33; E06C 7/14
USPC ..................... 280/47.26, 47.27, 47.28, 47.29
See application file for complete search history.

(56) References Cited

U.S. PATENT DOCUMENTS

| 2,576,755 | A |   | 11/1951 | Gaskins et al. |
| 2,856,018 | A |   | 10/1958 | Fegel |
| 2,964,328 | A | * | 12/1960 | Muir ........................ B62B 1/12 |
|           |   |   |         |                280/47.29 |
| 3,827,707 | A |   | 8/1974 | Bierman |
| 3,885,722 | A |   | 5/1975 | Robertson |
| 3,915,432 | A |   | 10/1975 | Bustamante |
| 3,998,476 | A |   | 12/1976 | Kazmark, Sr. |
| 4,145,028 | A |   | 3/1979 | Kelley et al. |
| 4,253,716 | A |   | 3/1981 | Turner, Jr. |
| 4,438,764 | A |   | 3/1984 | Eppolito |
| 4,614,331 | A |   | 9/1986 | Simon |
| 4,623,124 | A |   | 11/1986 | Lewis |
| 4,688,657 | A |   | 8/1987 | Erickson |
| 4,694,934 | A |   | 9/1987 | Erickson |
| 4,917,401 | A |   | 4/1990 | Iwaki |
| D320,879  | S |   | 10/1991 | Tsai |

(Continued)

FOREIGN PATENT DOCUMENTS

AT          9638 B      1/2008
FR       2658804 A1     4/1992

(Continued)

OTHER PUBLICATIONS

Office Action dated Sep. 28, 2023 from U.S. Appl. No. 17/869,651.

(Continued)

*Primary Examiner* — Steve Clemmons
(74) *Attorney, Agent, or Firm* — James E. Walton

(57) ABSTRACT

A tool cart has a compartment in the middle to store tool kits or other equipment. The tool cart contains a retractable dolly and a pair of straps to allow a user to carry it on their back. The side surfaces of the tool cart also contain compartments to store more tools or other equipment. The tool cart also has an extra carry-on tray to store more tools.

18 Claims, 18 Drawing Sheets

(56) References Cited

U.S. PATENT DOCUMENTS

| | | | |
|---|---|---|---|
| 5,333,885 A * | 8/1994 | Pullman | B62B 1/10 |
| | | | 273/285 |
| 5,370,263 A * | 12/1994 | Brown | E06C 7/14 |
| | | | 220/756 |
| 5,396,885 A | 3/1995 | Nelson | |
| 5,419,569 A | 5/1995 | Walla | |
| 5,431,428 A | 7/1995 | Marchwiak et al. | |
| 5,447,216 A | 9/1995 | Freyvogel | |
| 5,474,278 A | 12/1995 | Cleveland | |
| 5,564,720 A * | 10/1996 | Stringer | B62B 5/0023 |
| | | | 280/654 |
| 5,769,431 A * | 6/1998 | Cordova | B62D 51/04 |
| | | | 280/47.131 |
| 5,799,958 A * | 9/1998 | Bishop | B62B 1/14 |
| | | | 280/47.27 |
| 5,803,694 A | 9/1998 | Steele | |
| 5,829,585 A | 11/1998 | Kao et al. | |
| 5,947,351 A | 9/1999 | Garofalo et al. | |
| 6,070,888 A | 6/2000 | Wang | |
| 6,499,610 B2 | 12/2002 | Spitsbergen | |
| 6,945,438 B1 | 9/2005 | Shih et al. | |
| 6,969,090 B1 * | 11/2005 | Works | B60D 1/488 |
| | | | 280/901 |
| 7,143,912 B2 * | 12/2006 | Caneba | B62J 7/00 |
| | | | 280/654 |
| 7,246,805 B2 * | 7/2007 | Neal | A45C 13/385 |
| | | | 280/37 |
| 7,431,313 B1 * | 10/2008 | Torres | B25H 3/00 |
| | | | 280/47.24 |
| 7,438,084 B2 | 10/2008 | Trettin et al. | |
| 7,913,978 B1 | 3/2011 | Trihey et al. | |
| 7,942,429 B2 | 5/2011 | Hill | |
| 8,035,525 B2 | 10/2011 | Noonchester | |
| 8,132,819 B2 * | 3/2012 | Landau | B25H 3/027 |
| | | | 312/249.4 |
| 8,226,092 B2 * | 7/2012 | Oliver | B62B 1/14 |
| | | | 280/35 |
| 8,262,108 B2 | 9/2012 | Al-Hasan | |
| 8,641,056 B1 * | 2/2014 | Carter | B62B 1/26 |
| | | | 280/30 |
| 8,915,504 B1 * | 12/2014 | Seibert | B62B 3/005 |
| | | | 280/47.35 |
| 9,616,562 B2 * | 4/2017 | Hoppe | B25H 3/02 |
| 10,421,651 B1 | 9/2019 | Coleman et al. | |
| 10,683,199 B2 | 6/2020 | Stumpf | |
| 10,730,542 B1 * | 8/2020 | Guirlinger | B62B 1/24 |
| 10,738,533 B2 | 8/2020 | Weyrauch et al. | |
| 11,317,700 B2 | 5/2022 | Boyd | |
| 11,882,922 B2 | 1/2024 | Joko et al. | |
| 11,897,533 B2 | 2/2024 | Bradley et al. | |
| 12,012,140 B2 | 6/2024 | Marchal et al. | |
| 12,096,841 B2 * | 9/2024 | Hamon | B62B 5/067 |
| 2003/0019689 A1 | 1/2003 | Dorsett | |
| 2004/0084880 A1 * | 5/2004 | Kim | B62B 9/005 |
| | | | 280/47.24 |
| 2004/0129602 A1 * | 7/2004 | Sapyta | A45C 5/143 |
| | | | 206/748 |
| 2004/0144606 A1 * | 7/2004 | Han | A45C 5/14 |
| | | | 190/18 R |
| 2005/0017467 A1 | 1/2005 | Edwards | |
| 2005/0230340 A1 | 10/2005 | Barger, Sr. et al. | |
| 2006/0226619 A1 | 10/2006 | Sadow | |
| 2006/0261567 A1 | 11/2006 | Knox et al. | |
| 2007/0045973 A1 * | 3/2007 | Grosso | A01K 97/08 |
| | | | 280/47.26 |
| 2007/0145700 A1 * | 6/2007 | Ambrose | A47C 9/10 |
| | | | 280/47.26 |
| 2007/0194543 A1 * | 8/2007 | Duvigneau | B25H 3/026 |
| | | | 280/47.26 |
| 2008/0042379 A1 * | 2/2008 | Amran | B62B 7/06 |
| | | | 280/30 |
| 2009/0229914 A1 | 9/2009 | Liles | |
| 2011/0264014 A1 | 10/2011 | Angold | |
| 2013/0026726 A1 * | 1/2013 | Thomas | A45C 13/385 |
| | | | 280/43.1 |
| 2013/0213920 A1 | 8/2013 | Oliver et al. | |
| 2014/0084229 A1 | 3/2014 | Morrison | |
| 2015/0251680 A1 | 9/2015 | Carter | |
| 2019/0233266 A1 | 8/2019 | Delaney et al. | |

FOREIGN PATENT DOCUMENTS

| | | | | |
|---|---|---|---|---|
| GB | 2216862 A | | 10/1989 | |
| JP | 2019094145 A | | 6/2019 | |
| KR | 101500525 B1 | | 3/2015 | |
| NO | 309465 B1 | | 2/2001 | |
| SE | 443555 B | | 3/1986 | |
| WO | 0135736 A1 | | 5/2001 | |
| WO | WO-2018213560 A1 * | 11/2018 | | A45C 7/005 |
| WO | 2019102078 A1 | | 5/2019 | |

OTHER PUBLICATIONS

Office Action dated Oct. 12, 2023 from U.S. Appl. No. 17/869,651.
Office Action dated Mar. 13, 2024 from U.S. Appl. No. 17/869,651.
International Search Report dated Apr. 18, 2023 from International Appl. No. PCT/US2022/049659.
International Preliminary Report on Patentability dated Jun. 20, 2024 from International Appl. No. PCT/US2022/049659.
Amendment dated Jun. 13, 2024 from U.S. Appl. No. 17/869,651.
Notice of Allowance dated Jul. 31, 2024 from U.S. Appl. No. 17/869,651.
Office Action dated Mar. 22, 2024 from U.S. Appl. No. 17/883,110.
Internet Advertisement from unknown date, located on Google Shopping.

* cited by examiner

TOOL CART WITH BACKPACK STRAPS AND DOLLY

BACKGROUND

1. Field of the Invention

The present application relates to tool carts. In particular, the present application relates to tool carts that can be carried by the user and tool carts that have a dolly attachment.

2. Description of Related Art

It is common that buildings contain air conditioning, heating, and refrigeration equipment outside on top of the roof of the buildings themselves. Also, not every building has an easy access to get up onto the roof. Some have stairs, externally located building side ladders, internal building ladders that lead up through roof hatches, and some have no roof access stairs or ladders at all. This creates the present problem when the equipment on the roof needs maintenance or repair and the tools and equipment needed to repair them have to be physically transported up onto the roof and to the equipment. The overall safety and physical strain put on the user when getting the tools and equipment up onto and off of the top of the roof and to the equipment there is the main concern here. At the moment with the prior art, a user can only get the equipment up onto and off of the roof of a building by either dangerously single handedly carrying the equipment up and down the ladders and stairs of a building, or by dangerously tying a rope to the equipment with no known or secure place to connect the rope to.

At times an individual user will have to take multiple trips up and down ladders or stairs given the large number of tools and other equipment needed in order to repair this type of equipment on roofs. This creates an even more significant amount of danger and physical stress to the user as the individual has to climb and descend the ladder or stairs multiple times while carrying the heavy equipment. The strain comes from the individual user climbing the ladder with heavy equipment and with bringing the heavy equipment to the location itself. Individual users will typically use one hand to carry their tools or bags from their vehicle all the way up the ladder which leaves an uneven strain on the individual. This puts more strain on one side of the body over the other and the individual will deal with pain over time because of this. Also, if the individual gets exhausted or experiences spasms or complications while climbing the ladder, there is nothing to help prevent their equipment from dragging them off the ladder at that point or making the situation even worse.

The safety and physical stress of the individuals while working on these projects should be preserved but the current method of carrying up the equipment as the person single handedly goes up a ladder or stairs, or roping up the equipment with no known secure place to connect a rope or rope clip to, and then when on the roof having to hand carry all the equipment and tools to the unit does not preserve this. There have been some improvements to this by having general bags or boxes that individuals can attach to ladders, or hold in a safer manner, which decrease the safety risk. However, there are still numerous concerns on the safety and physical strain that is put on the individuals in this work.

Although there are some methods of carrying equipment to job sites that require the use of ladders and multiple dollies, many shortcomings still remain.

BRIEF DESCRIPTION OF THE DRAWINGS

The novel features believed characteristic of the present application are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
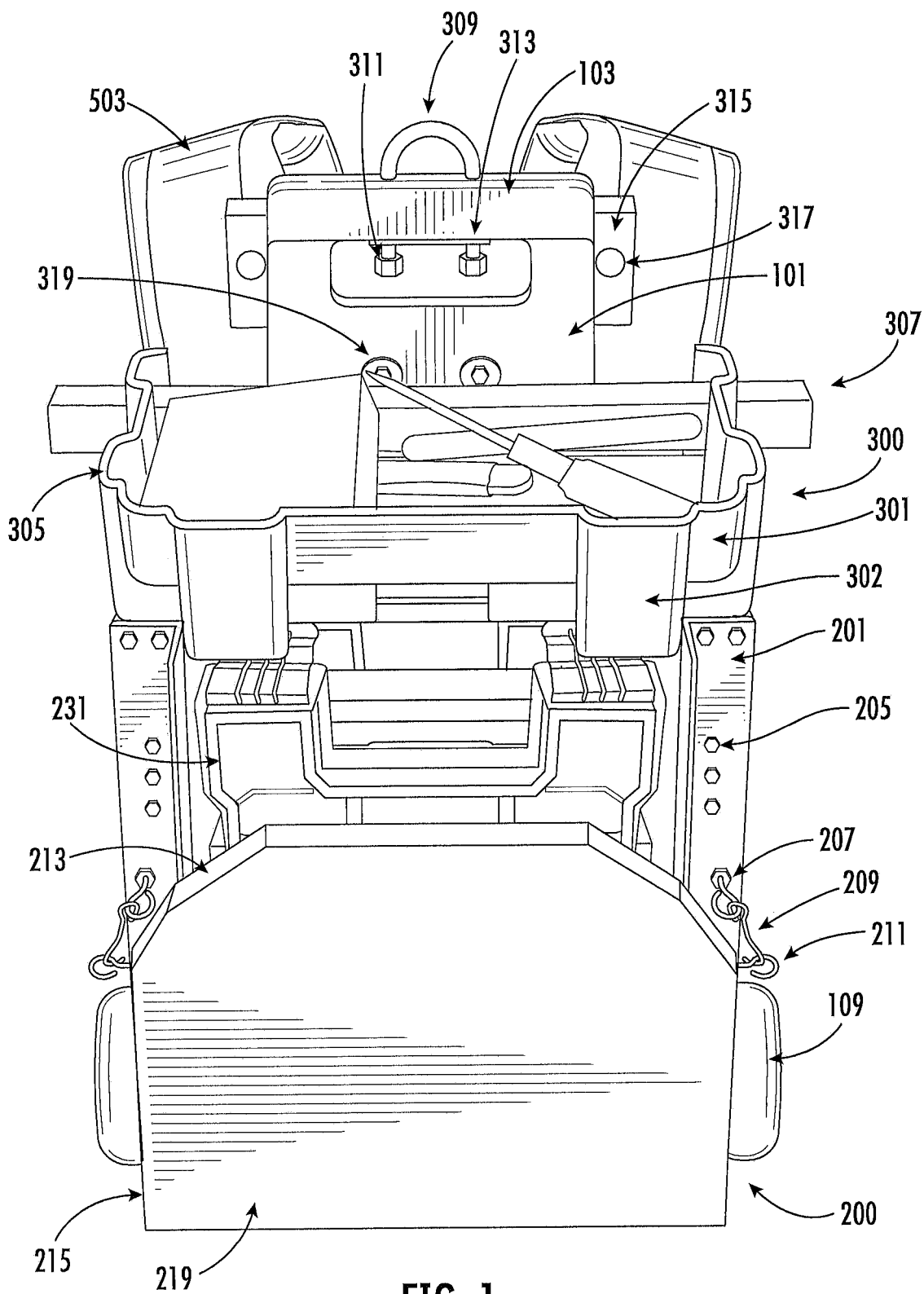
FIG. 1 is a front view of the tool carrier, according to the present application.

Referring to FIG. 1 in the drawings, the tool cart with backpack straps and dolly 100 is illustrated. FIG. 1 shows that tool cart 100 is comprised of a hollow arched base 101, a top handle portion 103, wheels 109, retractable dolly 200, L-shaped base 201, base fasteners 205, base fastener 207, fastening tab 209, dolly fastener 211, segmented arched dolly wall 213, dolly side walls 215, dolly base 219, tool kits 231, carry-on tray 300, carry-on tray walls 301, carry-on trap lip 305, cross bar handle 307, retractable hoist ring 309, hoist ring stoppers 311, hoist ring guard 313, strap attachment base 315, strap attachment fasteners 317, padded back fasteners 319, and replaceable padded straps 503. Tool Cart 100 is used in order to store tool kits 231, or other equipment, in the cart that will allow the user to cart their tools and equipment around without subjecting the individual to undue strain.

Although the present application has been described with respect to hand tools, power tools, and equipment used by workers, such as heating and air conditioning workers, it will be appreciated that tool cart 100 may easily be adapted and used by other types of workers, such as health care workers, military personnel, and other types of first responders. For example, emergency medical workers could use tool cart 100 as a medical rescue pack to store, transport, and use items such as automated external defibrillators, oxygen tanks, medicine, bandages, IV bags, and other such emergency medical equipment.

Base 101 is hollow in order to ensure that tool cart 100 will stay light weight enough for a user to carry it without issue. Tool cart 100 may be made out of plastic, metal, wood, or any other lightweight material. Top handle portion 103 forms the top of tool cart 100 and is square in shape and solid besides the handle portion at the very top and extends down to connect to back wall 105 of tool cart 100 which can be seen in FIG. 3. The bottom sides of handle portion 103 connect to end walls 107, also shown in FIG. 3, which in combination forms the storage area that tool kits 231 will be stored in. It is appreciated that the dimensions and shapes of the end walls may change to accommodate whatever various shapes of tool kits 231. Wheels 109 are at the bottom of tool cart 100 which allow the user to tow tool cart 100 without having to carry it.

Retractable hoist ring 309 is a U-shaped ring which is inserted into the top of hollow arched body 101 at top handle portion 103. The hoist ring 309 usually stays in the down position, due to gravity, but can be pulled up to allow the user to attach a rope, hoist, or any other object to hoist ring 309 to hoist it up somewhere so that way they don't have to carry it. Stoppers 311 prevent ring 309 from fully going through hollow arched body 101 when it is being hoisted. Stoppers 311 are larger than the hole that ring 309 is inserted through and so once ring 309 has gone a certain length it will no longer be able to be pulled out further. These stoppers make sure that ring 309 will not be pulled out of the system while tool cart 100 is being hoisted up. Hoist ring guard 313 is also found on the underside of top handle portion 103 which provides another guard for when hoist ring 309 is used. Hoist ring guard 313 will prevent stoppers 311 from damaging handle portion 103 when hoist 309 is engaged.

Strap attachment base 315 protrudes out from the sides of top portion 103 and is a location to attach replaceable straps 503 to tool cart 100. Straps 503 are secured to attachment base by strap attachment fasteners 317. Fasteners 317 keep straps 503 in place on tool cart 100 while also allowing the user to undue fasteners 317 in order to replace straps 503. Also shown in this area, padded back fasteners 319 are located in top portion 103 below the handle. Fasteners 319 connect the padding found on the back of tool cart 100 to hollow arched body 101.

Figure 2:
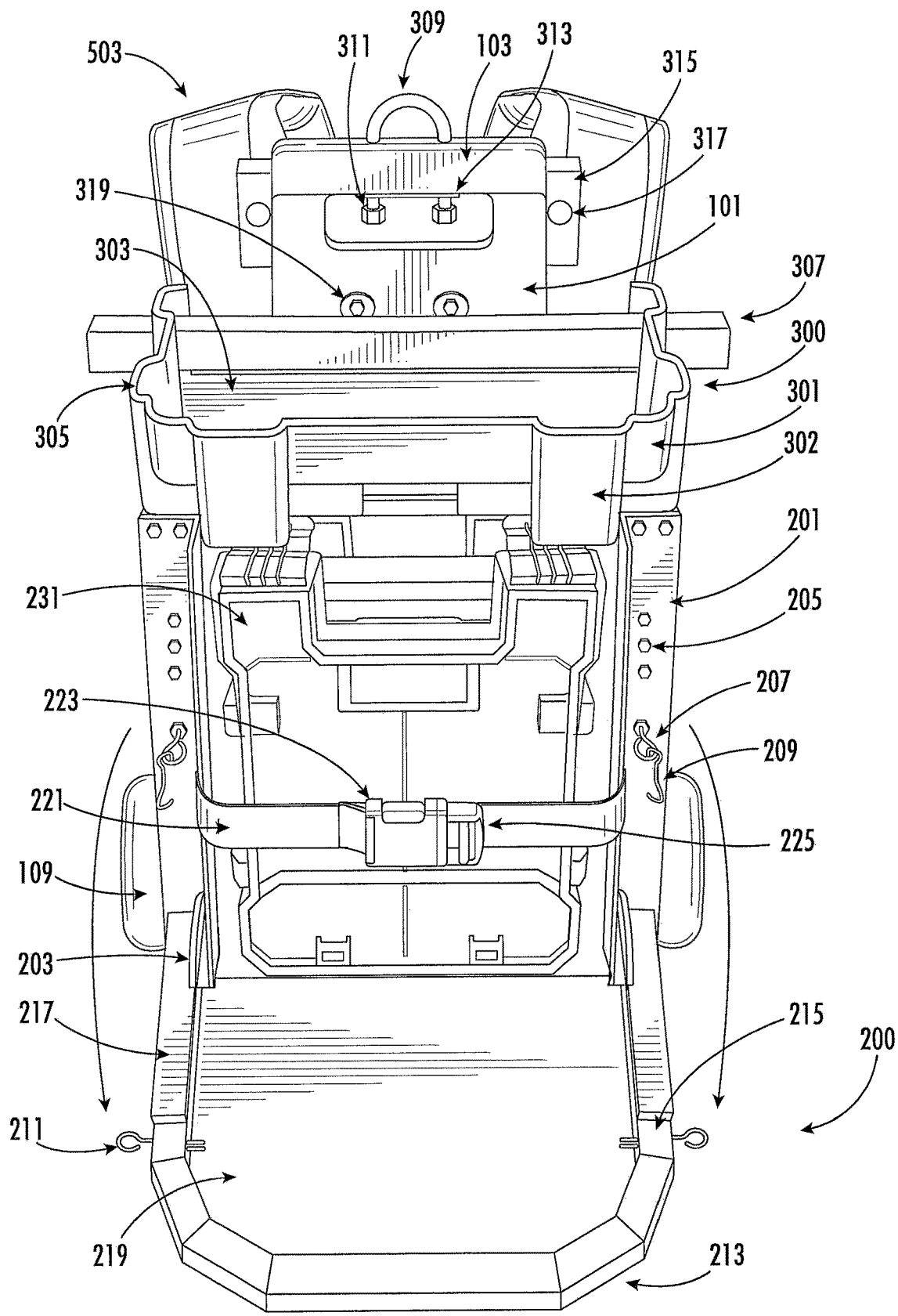
FIG. 2 is a front view of the tool carrier, according to the present application.

Referring now to FIG. 2 in the drawings, the front of tool cart 100 is depicted with the retractable dolly 200 in the down position. Retractable dolly 200 further comprises L-shaped base 201, dolly support hinge 203, base fasteners 205, base tab 207, fastening tab 209, dolly tab 211, segmented arched dolly wall 213, dolly side walls 215, support base 217, dolly base 219, security strap 221, security strap buckle housing 223, security strap buckle insert 225, and tool kits 231. FIG. 2 also depicts carry-on tray 300, carry-on tray walls 301, carry-on tray wall protrusions 302, carry-on tray base 303, carry-on tray lip 305, cross bar handle 307, hoist ring 309, hoist ring stoppers 311, hoist ring guard 313, strap attachment base 315, strap attachment fasteners 317, padded back fasteners 319, and replaceable padded straps 503.

Retractable tow cradle 200 is designed to act as a dolly and hold another object on tool cart 100 while it is in tow. This object could be a tank, a vacuum pump, more tools, or any other object that the user wants to tow. This gives the user a place to tow the heavy objects so that way they do not have to physically carry them with their hands while traveling to the job site. This will save trips and also prevent the user from experiencing undue strain on the body. Tow cradle 200 may be made out of plastic, wood, metal, or any other light weight material.

Retractable tow cradle 200 is formed by having walls surrounding base 219. The first wall is the front wall which is segmented arched dolly wall 213. Wall 213 is segmented into 5 straight sections, but may be split into any number of sections, that form an arch for a front walls. The final two segments on either side connect to end walls 215. There is no back wall and these walls form a small barrier used to prevent objects being towed from sliding off of the dolly.

Figure 6:
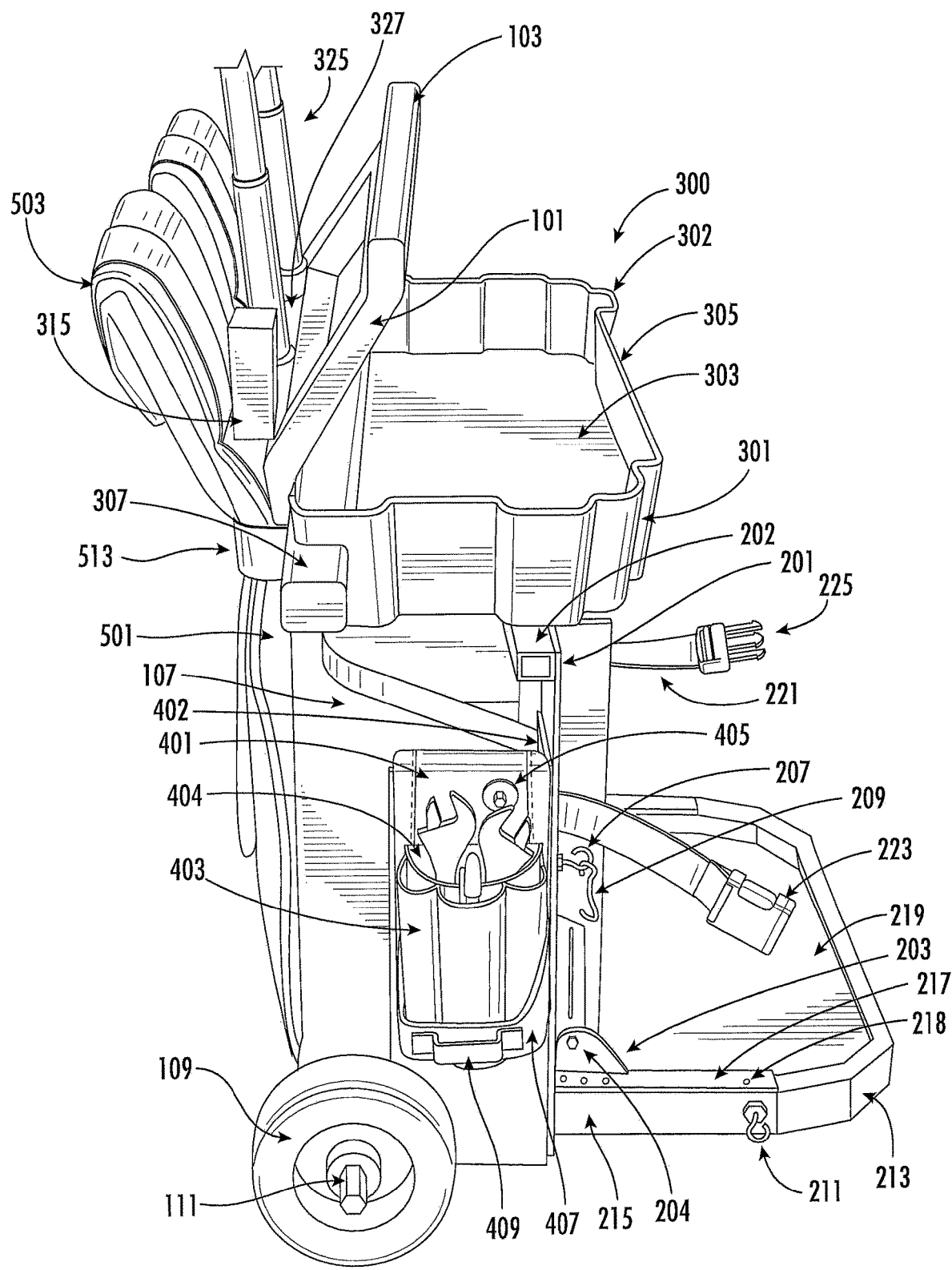
FIG. 6 is a left side view of the tool cart, according to the present application.

Connecting to end walls 107 is L-shaped base 201 which has one end extending out from end wall 107 and another end perpendicular to end wall 107 which is connected to base support 202 and tool bag support 402, which can be seen in FIG. 6, by fasteners 205. Base support 202 is a rectangular projection that goes through the top of end walls 107. Connected at the bottom of base 201 is dolly support hinge 203 which is connected to base 201 by rotatable fastener 204, which can be seen in FIG. 6. Curved base support further connects to support length 217 that is fastened to the top of end walls 215 by fasteners 218, also seen in FIG. 6, which fully connect the base 201 to retractable tow cradle 200. Using rotatable fastener 204 with support hinge 203, a user will be able to rotate retractable tow cradle 200 into the retracted or upright position.

When the retractable tow cradle 200 is in the upright position, fastening tab 209 is used to keep it in place. Fastening tab 209 is hook shaped on both ends of the tab and is used to secure retractable tow cradle 200 to base 201. Attached to base 201 is base tab 207 which extends out from base 201 and forms, but is not limited to, a hook shape. Fastening tab 209 is hooked by base tab 207 by connecting the hook shapes found at the end of each of these tabs, fastening tab 209 is then hooked to dolly tab 211 in the same way. Dolly tab 211 is connected to, and extends through end wall 215. Dolly tab 211 is similar in shape to the other tabs in that it has a hook shaped protrusion at the end which fastening tab 209 connects to. Once fastening tab 209 is secured to both base tab 207 and dolly tab 211, retractable tow cradle 200 will be firmly secured in the upright position.

FIG. 2 also shows security strap 221 being used to secure tool kits 231 in place. The compartment that is formed by back wall 105 and end walls 107 is large enough to allow the user to store up to two standard tool kits 231 in that compartment. It should be appreciated that other equipment may be stored in that compartment besides the tool kits presented. Security strap 221 is then used to secure tool kits 231, or any other object, in place during movement. Straps 221 are connected on both sides to end walls 107, the left end of strap 221 has security strap buckle housing 223 while the right end has security strap buckle insert 225. Buckle insert 225 is inserted into buckle housing 223 when the user wishes to securely confine the contents of the compartment.

Depicted towards the top of tool cart 100, another container to carry tools, carry-on tray 300, is shown. Carry-on tray 300 may be made out of plastic, wood, metal, or any other light weight material. Carry-on tray 300 is rectangular in shape and is formed by walls 301 which may also have curved protrusions 302 along the walls all of which connect down to base 303. It is appreciated that the shape of carry-on tray 300 may be differ and is not restricted to being rectangular. Protrusions 302 extend out from the sides of walls 301 in a rectangular shape, going from the top of the wall to the bottom connecting to the base, but it is appreciated that these protrusions may take on any shape. At the top of walls 301 there is carry-on tray lip 305 which extends slightly outward from walls 301. Cross bar handle 307 also goes through carry-on tray 300 which can be used as extra support for the tray. Cross bar handle 307 is rectangular in shape and protrudes out from both sides of tool cart 100 and may be used by the user as a means of lifting up tool cart 100.

Figure 3:
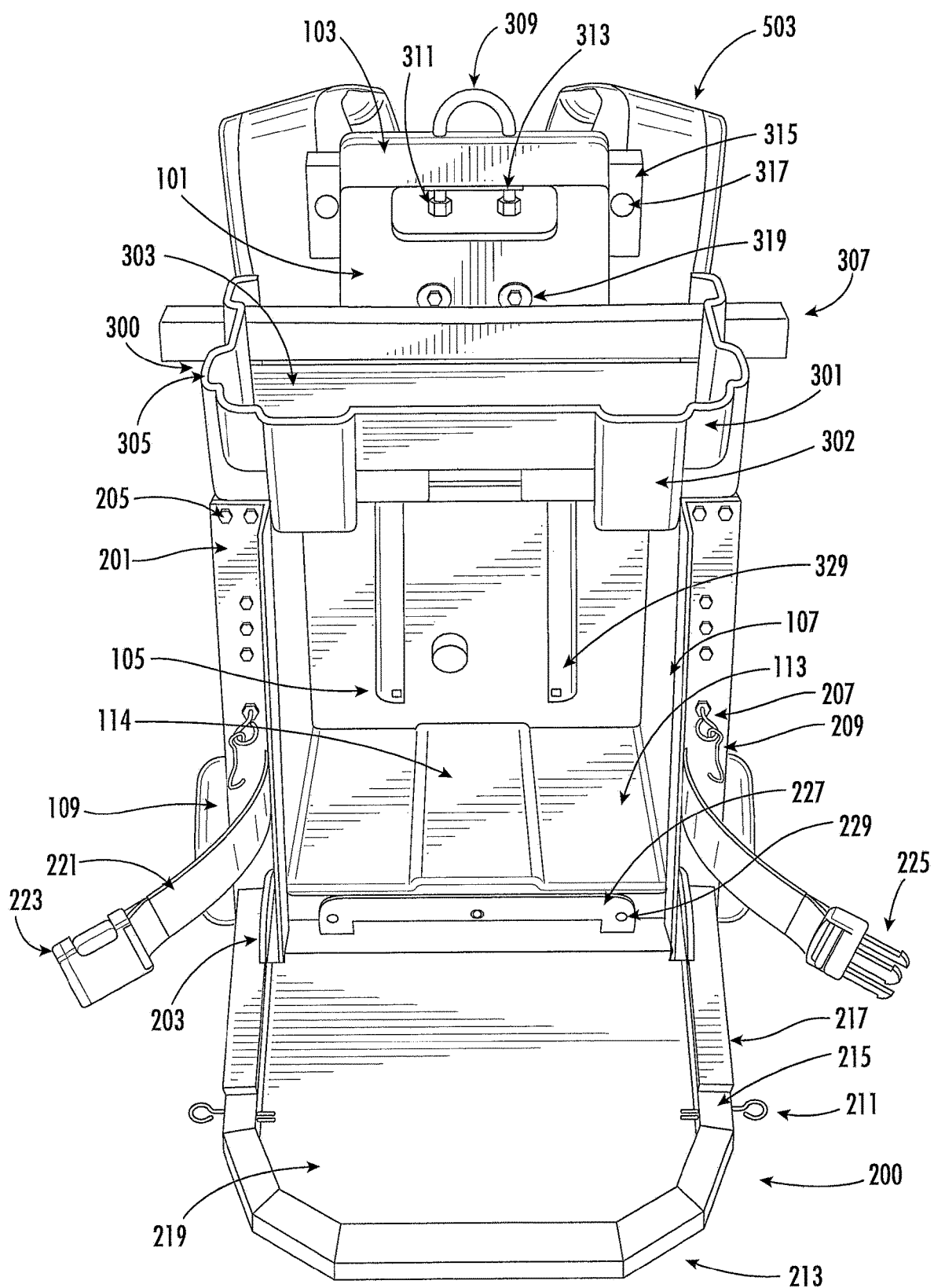
FIG. 3 is a front view of the tool cart, according to the present application.
Figure 4:
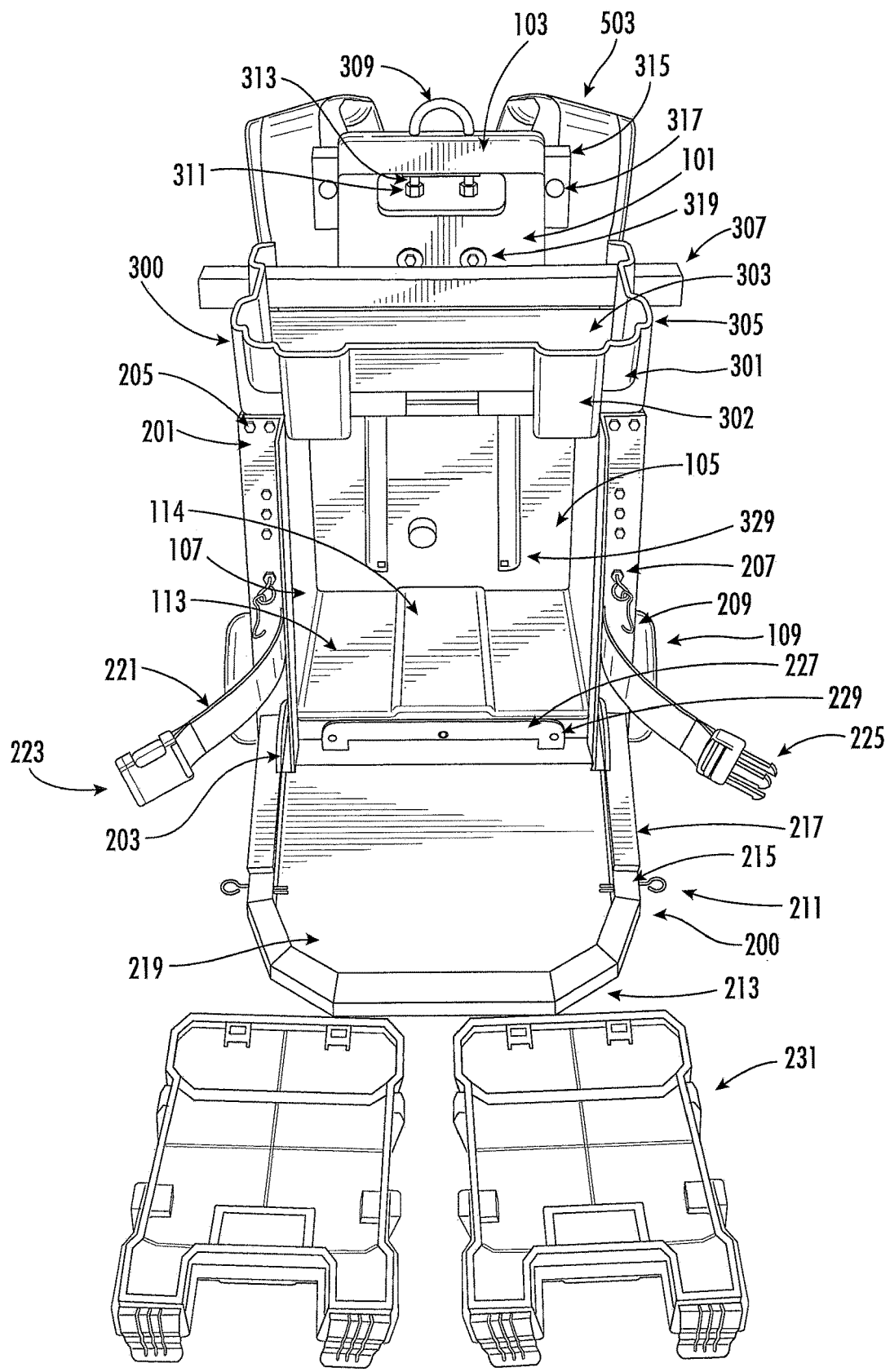
FIG. 4 is a front view of the tool cart, according to the present application.

Referring now to FIGS. 3 and 4 in the drawings, a front view of tool cart is shown without tool kits 231 inserted in it. These figures provide a clear look at the compartment that is formed where tool kits 231 will be stored. Base 113 is shown as having an upward protrusion 114 along the center of it which creates two outer grooves which are designed to accommodate tool kits 231, or other objects, and have them properly secured in the compartment. It is appreciated that the shape of the protrusion 114 on base 113 may be subject to change depending on the need. Base 113 connects to back walls 105 and end walls 107 at their bottom as the final portion of the storage compartment. Attached to the front of base 113 are support legs 227 which is fastened to the front of base 113 by fasteners 229. Support legs 227 are used to support tool cart 100 in place when not in movement as they will prevent the cart from tipping over forward.

Figure 5:
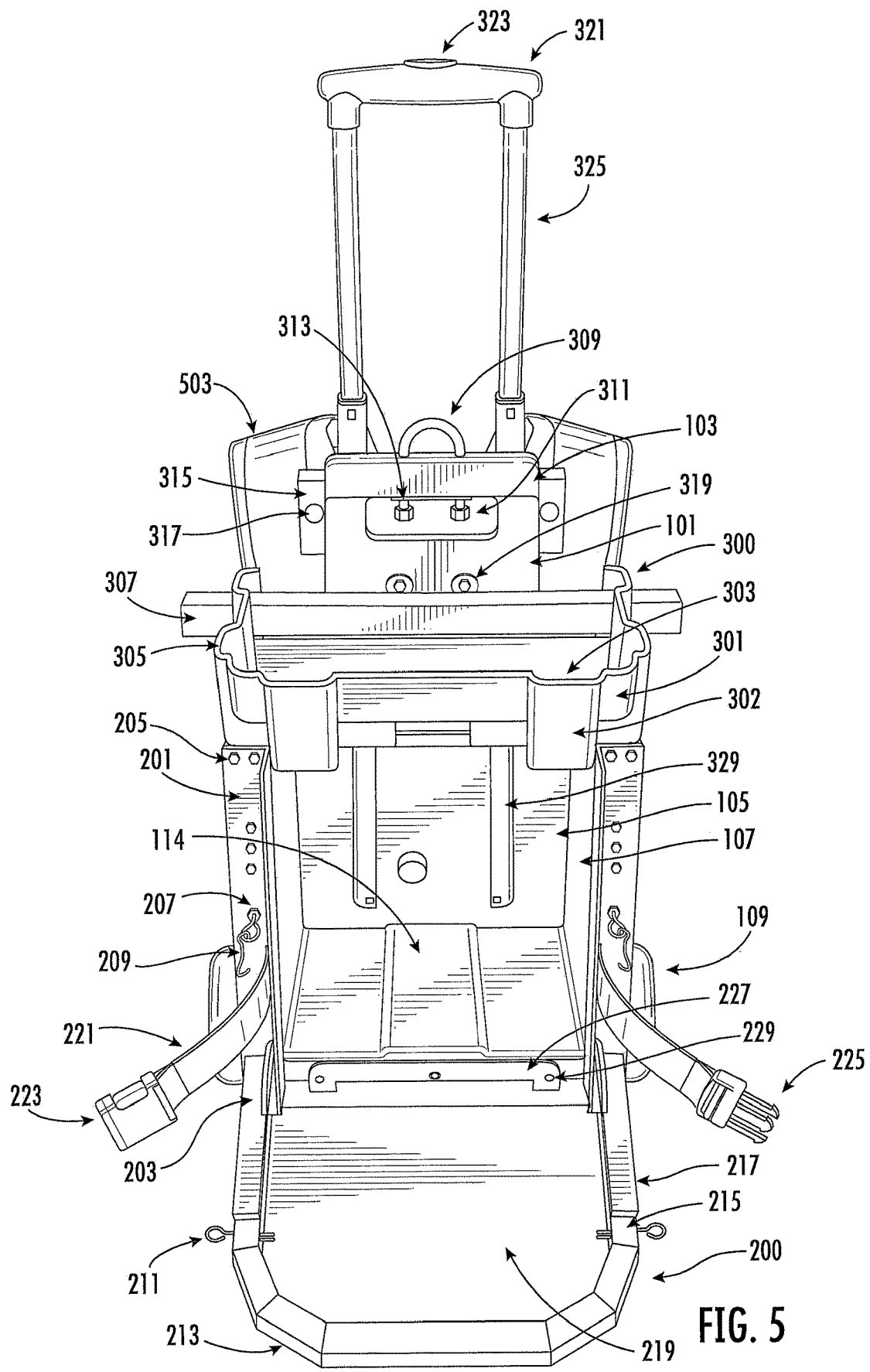
FIG. 5 is a front view of the tool cart, according to the present application.

Referring now to FIG. 5 in the drawings, a front view of tool cart is shown with the tow system displayed. Tow system is formed by tow handle 321, handle release 323, telescoping bars 325, tow handle base 327, and bar storage 329. Tow handle 321 is found towards the top of tool cart 100 and is used in combination with wheels 109 to allow a user to tow tool cart 100 behind them. At the top of tow handle 321 is tow handle release 323 which, when pressed down, releases tow handle 321 to be pulled away from arched body 101. When pressed down, tow handle release 323 releases telescoping bars 325 to allow them to be pulled out of tow handle base 327, which can be seen in FIG. 6. When not in use, telescoping bars 325 are stored in bar storage 329 which is attached to back wall 105.

Figure 7:
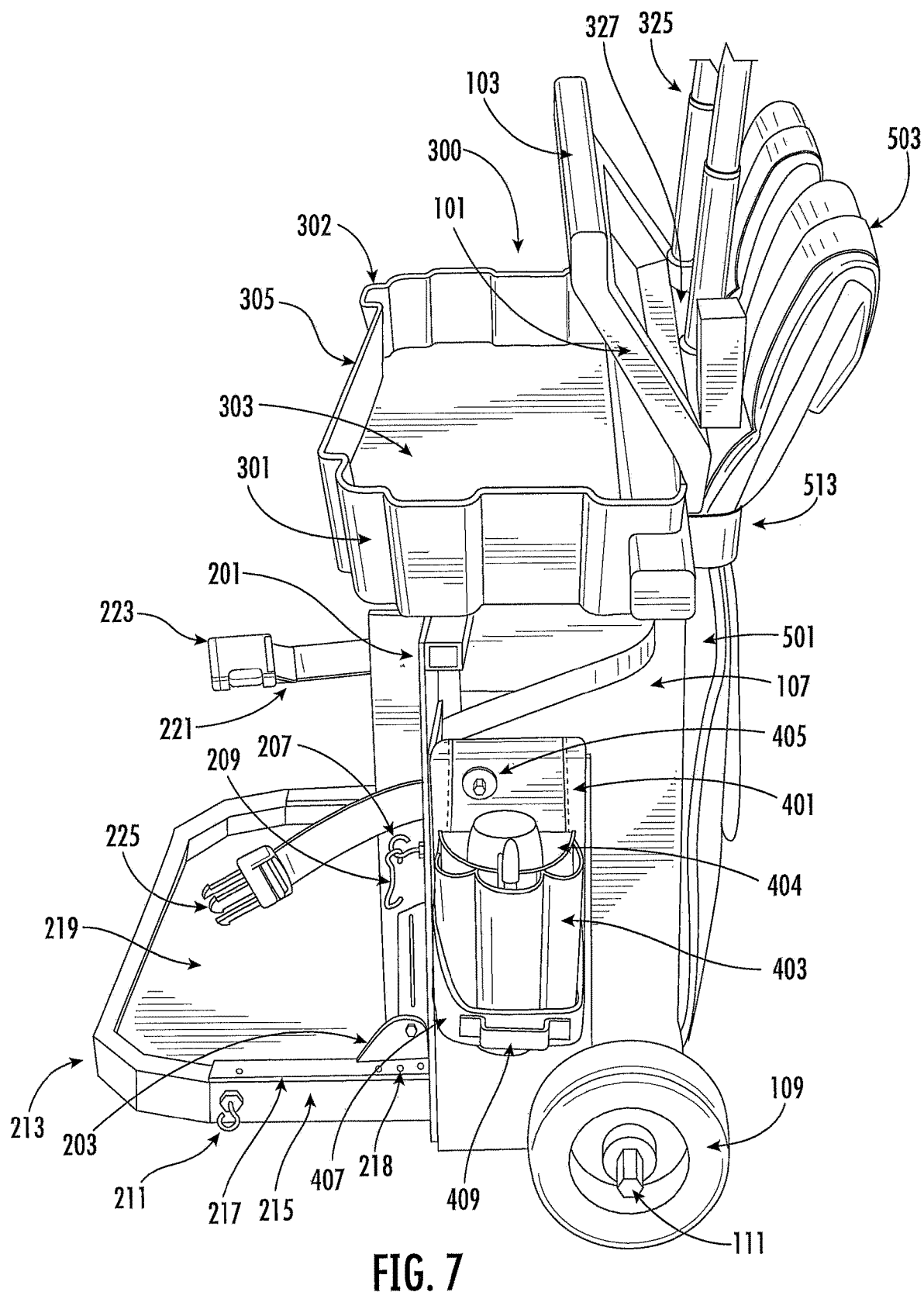
FIG. 7 is a right side view of the tool cart, according to the present application.

Referring now to FIGS. 6 and 7 in the drawings, a side view of tool cart 100 is depicted. These figures show that the sides of tool cart 100 comprise tool carriers 401, tool carrier support base 402, tool carrier pouches 403, larger tool carrier pouch 404, tool carrier fasteners 405, tool carrier support strap 407, and tool carrier support bar 409. FIGS. 6 and 7 also provide a look at axle 111 which connects wheels 109 while running through the bottom of tool cart 100. These figures also provide another look at dolly supports 203, rotatable fasteners 204, support length 217, support length fasteners 218, back cushion 501, back straps 503, and security strap 513.

Tool carriers 401 are designed in order to allow for the user to store tools, or other equipment, on the side of tool cart 100 which gives them more storage space during transit. Tool carrier 401 is connected to support base 402 which connects it to base 201. Tool carrier 401 consists of three smaller carrier pouches 403 and one larger carrier pouch 404, however, the amount of pouches may vary. These pouches are big enough to store standard tools and are deep enough to prevent tools or other equipment from falling out during transit. Tool carriers 401 are attached to end walls 107 by fastener 405 in the upper right of tool carrier 401. Tool carrier support strap 407 is found at the bottom of tool carrier 401 and is another source of support for tool carrier when the pouches are full as this strap will help maintain the stability during movement. Tool carrier support bar 409 is found on support strap 407 and provides another anchor point when the user is wishing to hoist tool cart 100.

Figure 8:
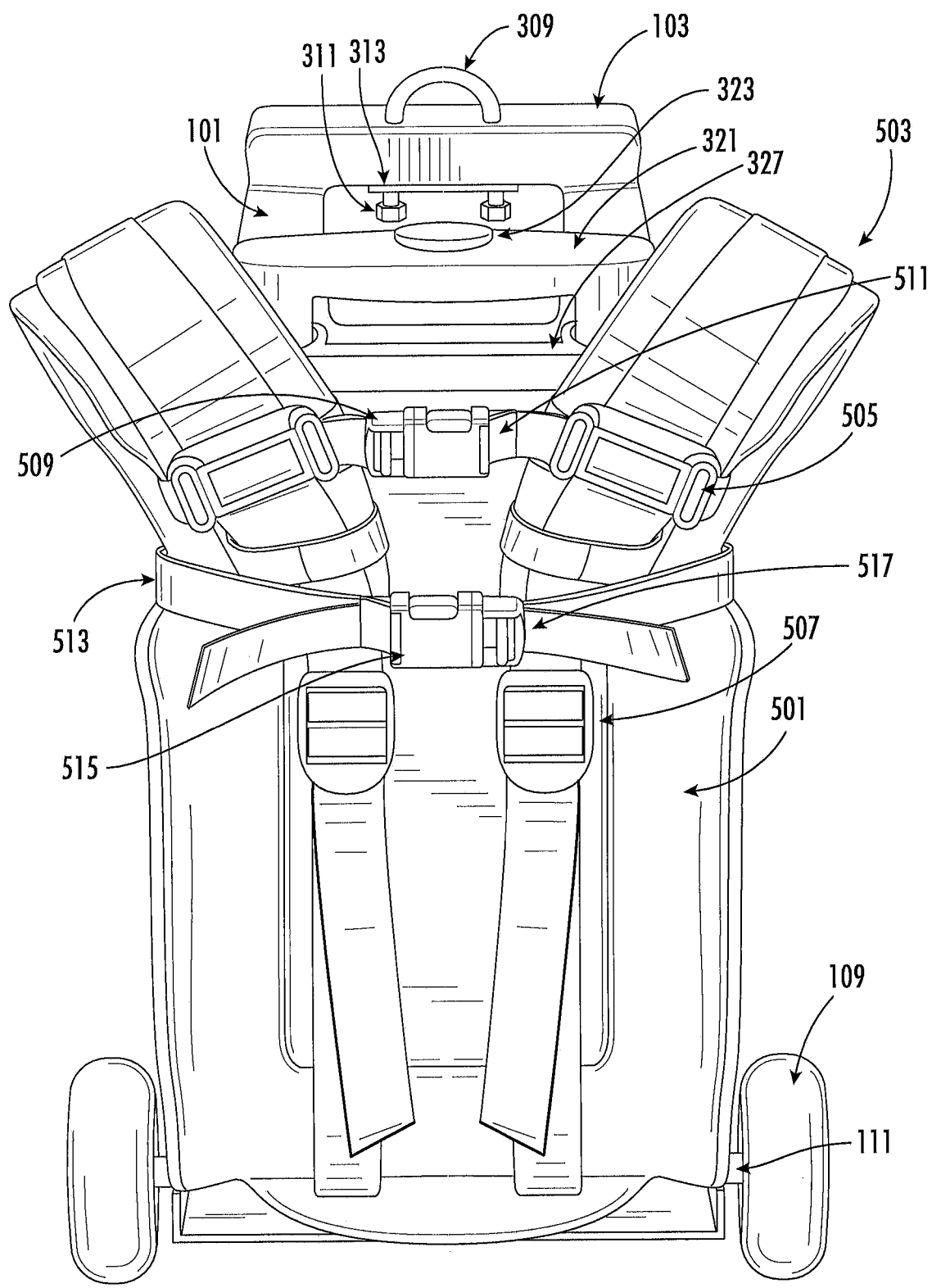
FIG. 8 is a back view of the tool cart, according to the present application.

Referring now to FIG. 8 in the drawings, the back of the tool cart 100 is depicted. In this figure, the wheels 109 of tool cart 100 are seen as being connected by axel 111 which goes through the bottom of the hollow arched body 101 of tool cart 100. Further, FIG. 8 also shows that the back of the cart comprises hollow arched body 101, top handle portion 103, hoist ring 309, hoist ring stoppers 311, hoist ring guard 313, tow handle 321, handle release 323, tow handle base 327, back cushion 501, padded replaceable straps 503, upper tightening grip 505, lower tightening grip 507, strap buckle housing 509, strap buckle insert 511, security strap 513, security strap buckle housing 515, and security strap buckle insert 517.

Back cushion 501 is attached directly to the back of hollowed arched body 101. Back cushion 501 supports the user while they are wearing the cart and makes it easier for them to carry it around for longer periods of time. Connected to the top of back cushion 501 are two padded replaceable straps 503 which are attached to the upper left and right side of cushion 501. Padded straps 503 allow the user to carry tool cart 100 on their shoulders which let users carry it for longer periods and experience less fatigue when having to go up stairs, building ladders, or extension ladders. Also, straps 503 being replaceable will allow the user to change them out if they become worn down or if the user desires straps that have more cushion. Padded replaceable straps 503 can also be tightened to fit the body of the user by using upper tightening grip 505 or lower tightening grip 507 to achieve this. These tightening grips will use the extra lengths of the straps to either make it tighter or looser on the user which will allow the user to set it to where it fits best on them so it's secured and comfortable.

Strap buckle housing 509 is found on the left padded strap 503 when looking at the back of tool cart 100 and strap buckle insert 511 is on the right padded strap 503. Buckle insert 511 will be inserted into buckle housing 509 to secure the two padded straps 503 together. When secured in this fashion, the straps will not be able to slide off the user during movement. Security strap 513 provides a strap which holds the wide padded backpack straps up in place and keeps them high and tight and out of the way so that don't drag the ground or get damaged when not in use, storing, or towing tool cart 100. Security strap 513 is attached to the sides of tool cart 100 and strap 513 buckles over padded straps 503 when securing the carrier to the user. On the left end of security stray 513 is buckle housing 515 while on the right end is buckle insert 517. Buckle insert 517 will be inserted into housing 515 to firmly secure the straps in place.

Figure 9:
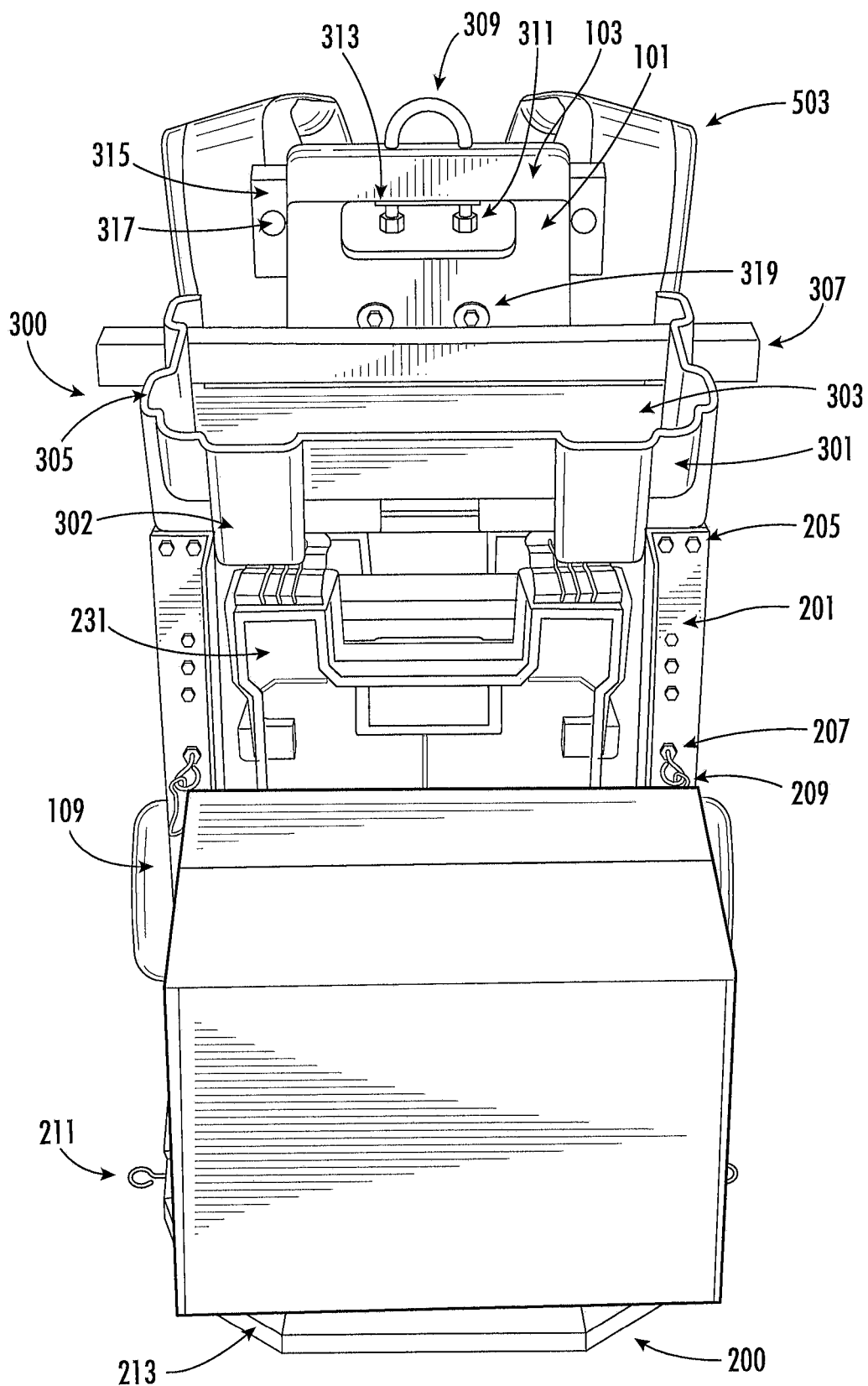
FIG. 9 is a front view of the tool cart, according to the present application.

Referring now to FIG. 9 in the drawings, a front view of tool cart 100 is depicted. FIG. 9 shows the tool cart while retractable tow cradle 200 is in the down position and has a box on the cradle. This figure demonstrates how a user would use tow cradle 200 to tow equipment, tools, or other objects with them to a job site.

Figure 10:
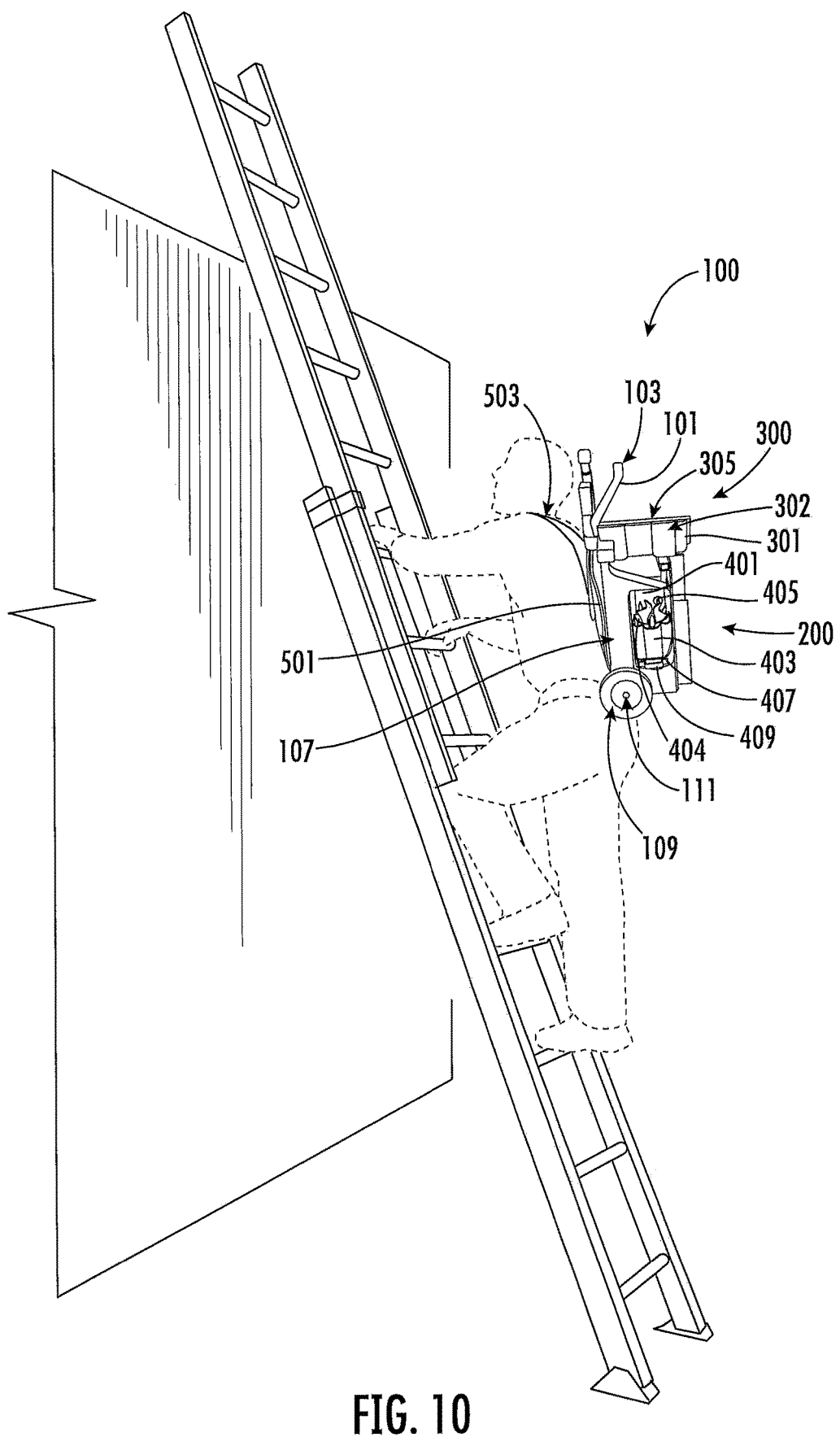
FIG. 10 is a perspective left view of the tool cart, according to the present application.

Referring now to FIG. 10 in the drawings, a side view of tool cart 100 is depicted. In this figure, an individual is depicted going up an extension ladder while having tool cart 100 secured to their back. FIG. 10 illustrates the ease of which an individual can carry tools and other equipment safely up an extension ladder without having to take either of their hands off the ladder.

Figure 11:
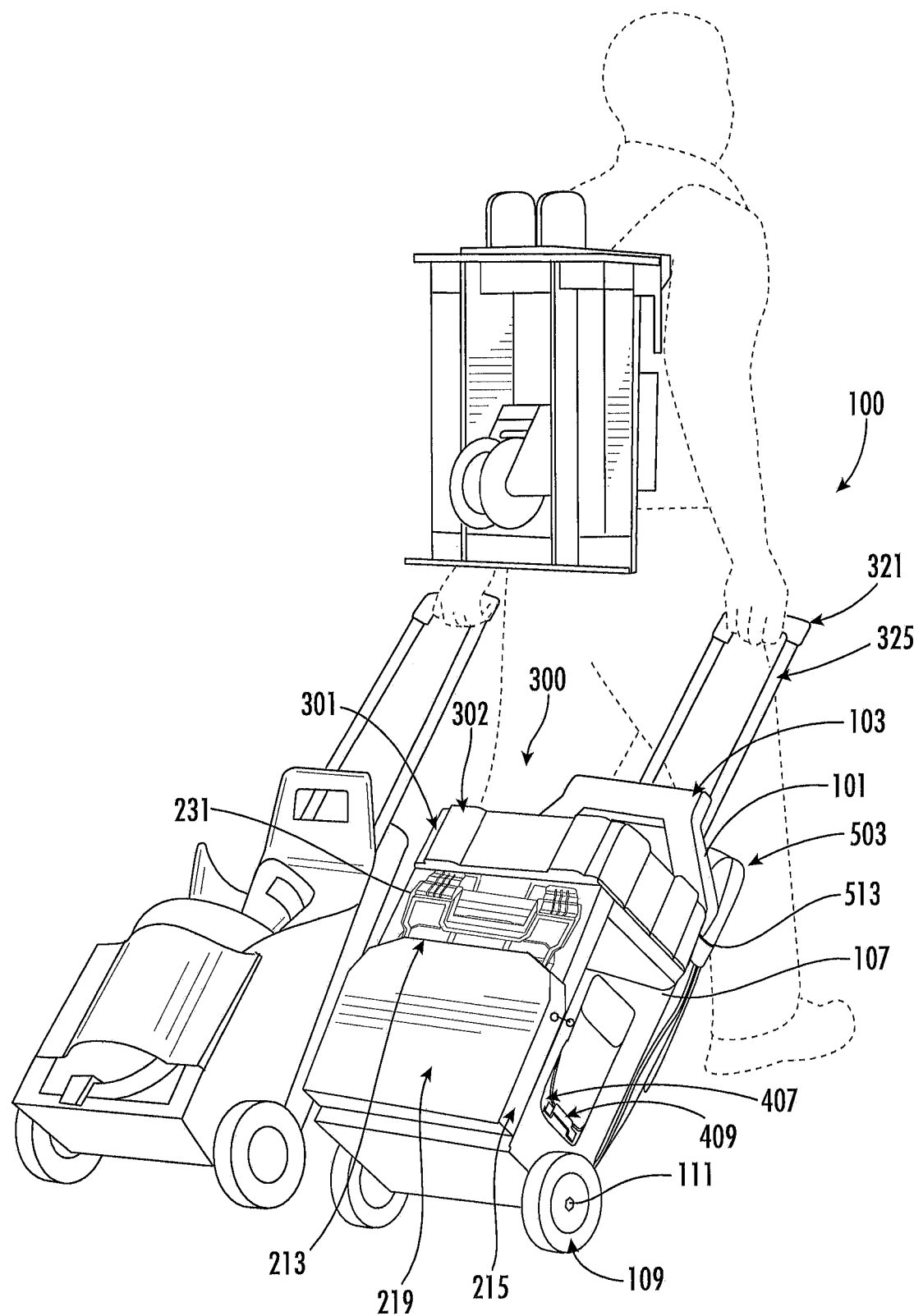
FIG. 11 is a perspective right view of the tool cart, according to the present application.

Referring now to FIG. 11 in the drawings, a perspective side view of tool cart 100 is depicted. FIG. 11 shows an individual using tow handle 321 to tow tool cart 100 behind them without having to carry it. This frees up the users hands as they only need one hand to do this so they can tow another cart behind them or have that hand free to do other tasks during transit.

Figure 12:
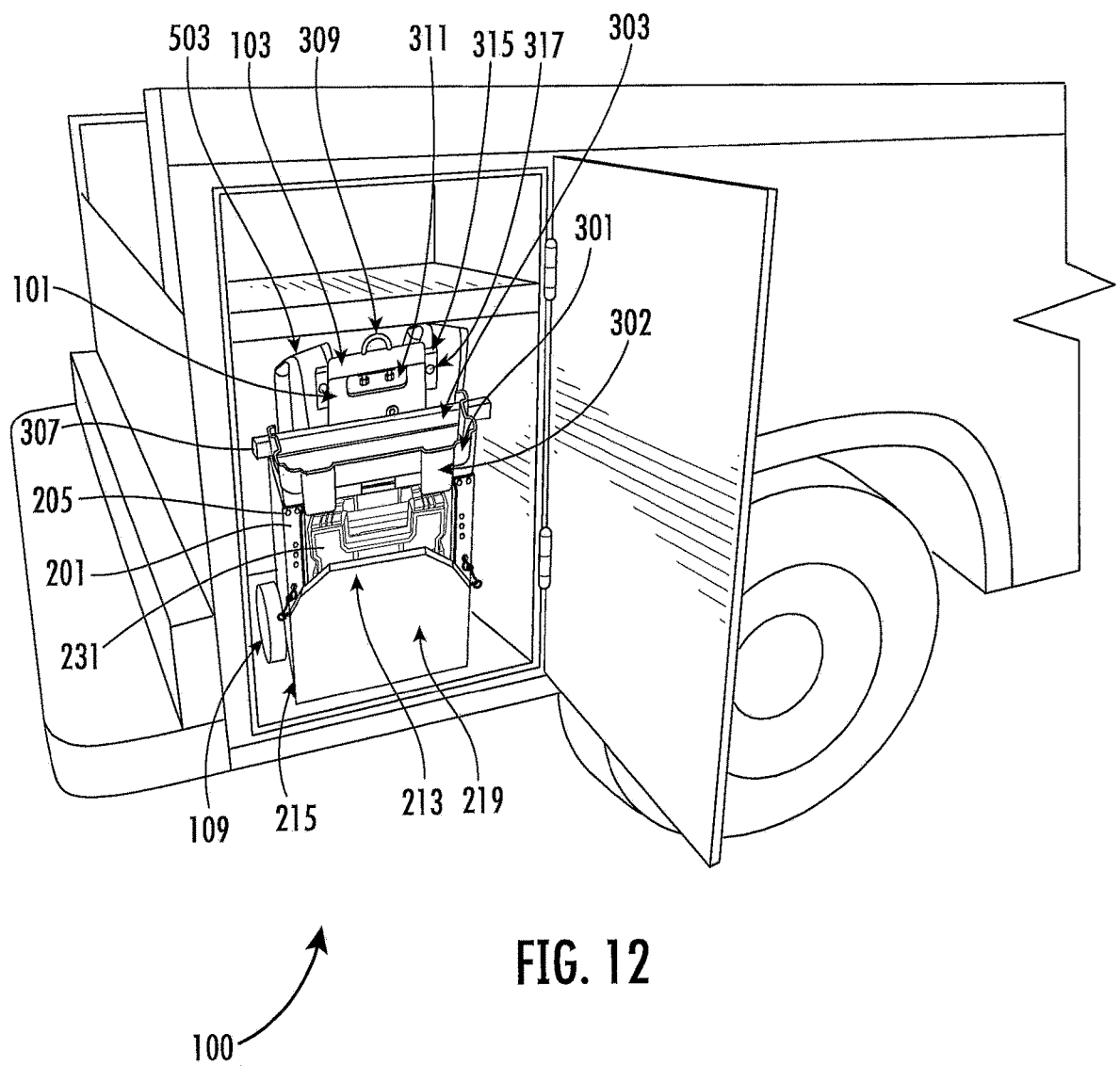
FIG. 12 is a perspective front view of the tool cart, according to the present application.

Referring now to FIG. 12 in the drawings, a perspective front view of tool cart 100 is depicted. FIG. 12 shows how tool cart 100 is compact enough to fit inside a standard storage compartment that can be found on work trucks. It is important that tool cart 100 be small and compact and that it does not take up too much space when it is stored.

Figure 13:
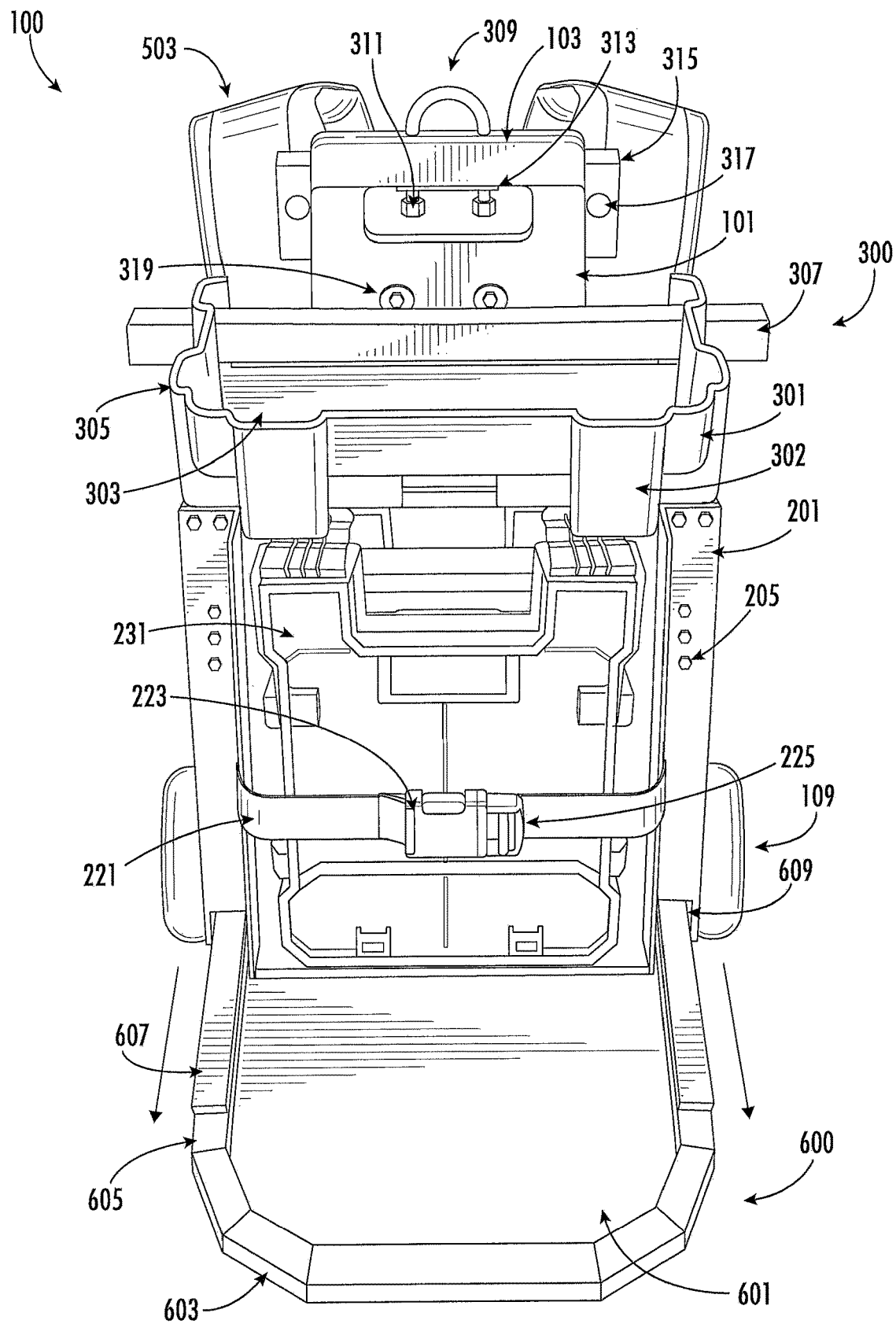
FIG. 13 is a front view of an alternative embodiment of the tool cart, according to the present application.

Referring now to FIG. 13 in the drawings, a front view of tool cart 100 with an alternative embodiment of retractable tow cradle 200 is depicted. FIG. 13 shows an alternative embodiment of retractable tow cradle 200 where instead it is a slide out tow cradle 600. Slide out tow cradle is comprised of base 601, segmented front wall 603, end walls 605, support base 607, and slide out compartment 609. Slide out tow cradle 600 has a similar structure to retractable tow cradle 200 but instead of using tabs and hooks to secure it in the upright position, slide out tow cradle is slid into compartment 609 when it is not in use.

Figure 14A:
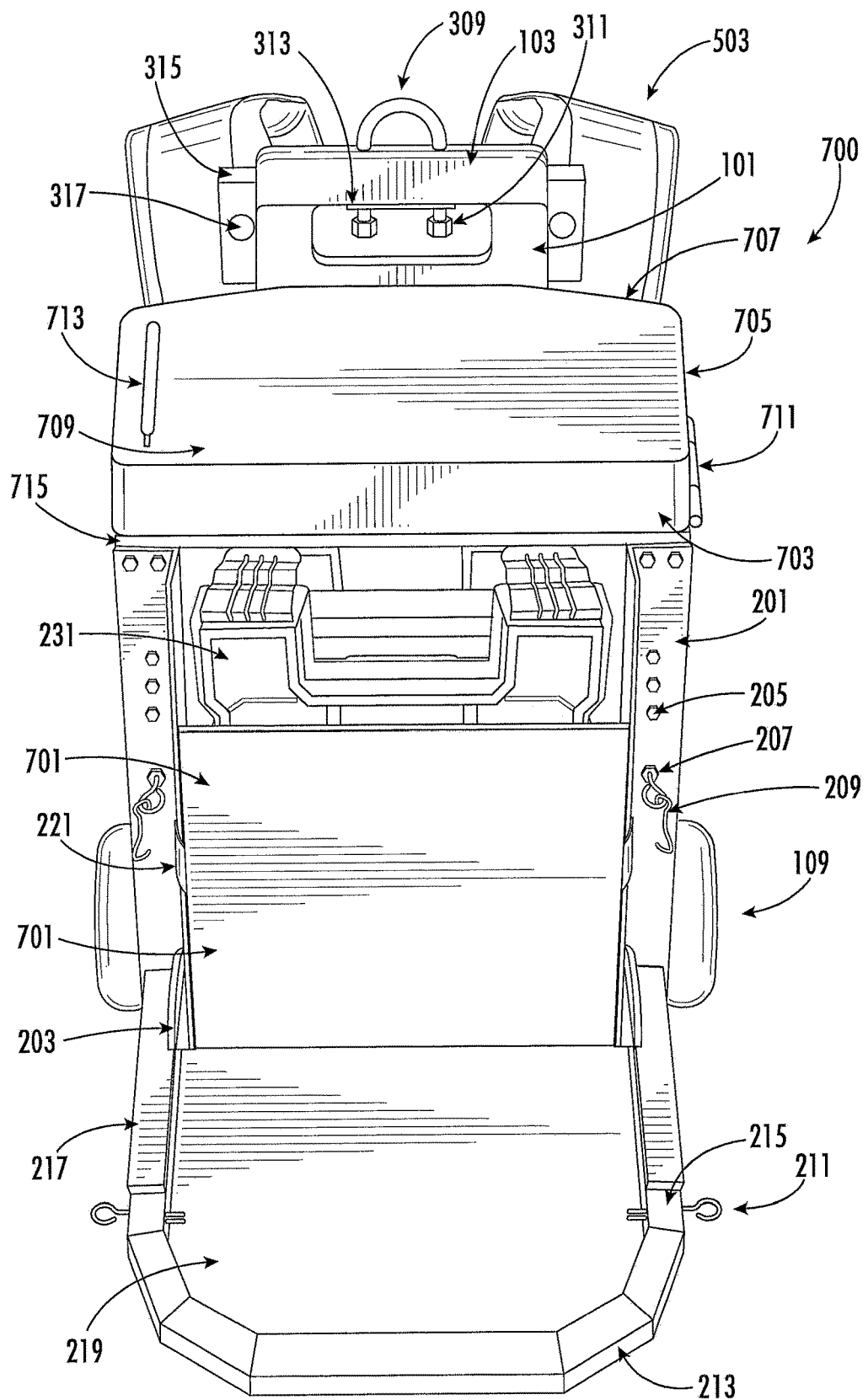
FIGS. 14A and 14B are front views of another alternative embodiment of the tool cart, according to the present application.
Figure 14B:
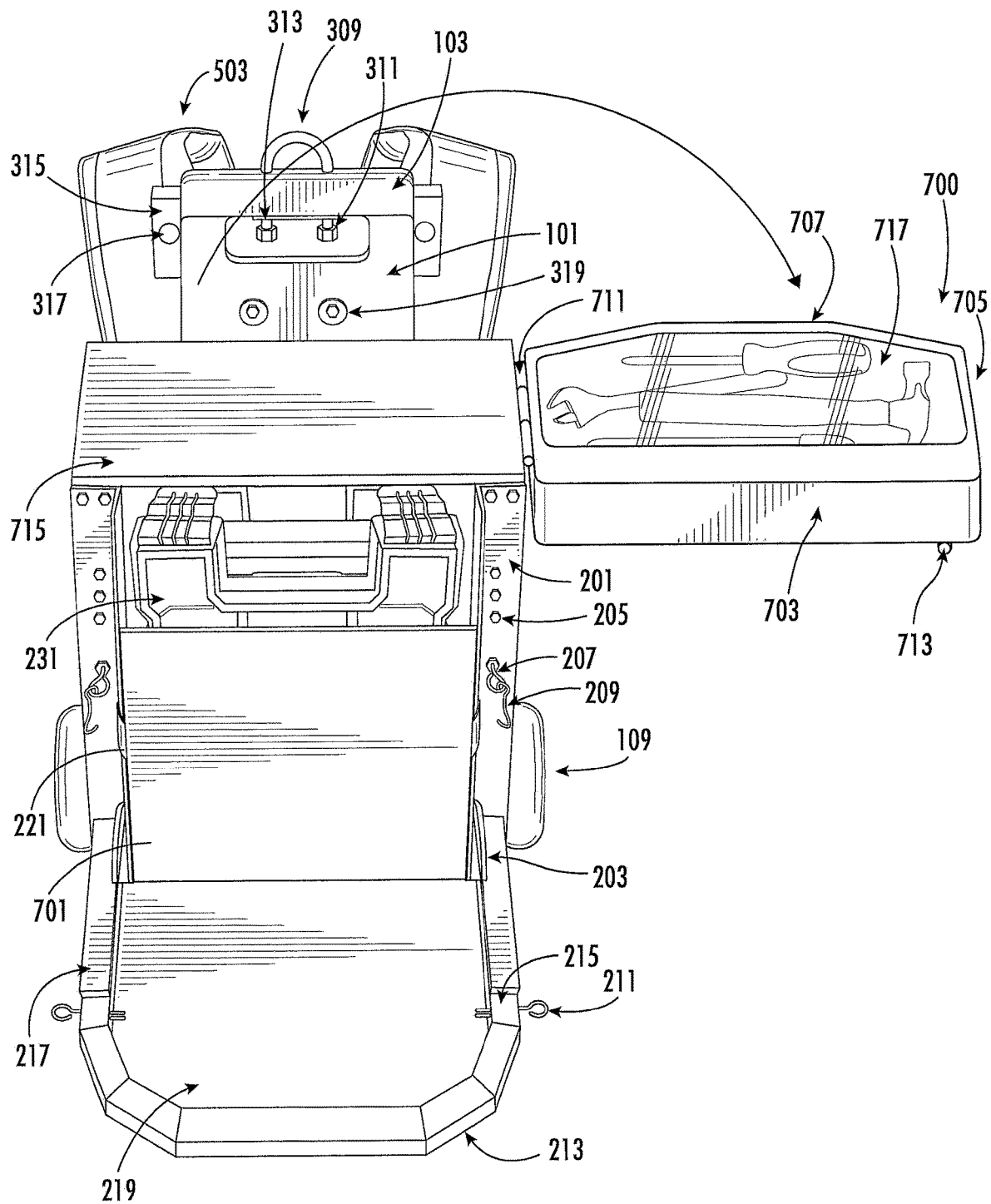

Referring now to FIGS. 14A and 14B in the drawings, a front view of tool cart 100 with an alternative embodiment of carry-on tray 300 is depicted. Instead of having carry-on tray 300, carry-on drawer 700 is shown to comprise front wall 703, end walls 705, segmented back wall 707, top portion 709, hinge 711, handle 713, base 715, and cover 717. FIG. 14A depicts carry-on drawer 700 in the closed position and shows that the drawer is formed by the 4 walls forming together, with front wall 703 and end walls 705 being straight and segmented back wall 707 being segmented into 3 straight sections, though it is understood that back wall 707 may be segmented into less or more sections, and the top of all 4 walls being connected by top portion 709. Covering over the top of where tool kits 231 are stored, is base 715 which is rectangular in shape. Connecting the side of base 715 with the bottom of one end wall 705 is hinge 711 which allows the user to open carry-on drawer 700 when they pull on handle 713 attached to top portion 709. FIG. 14B depicts the carry-on drawer 700 in the open position which shows compartment 717 where tools, equipment, or other items may be stored.

Figure 15A:
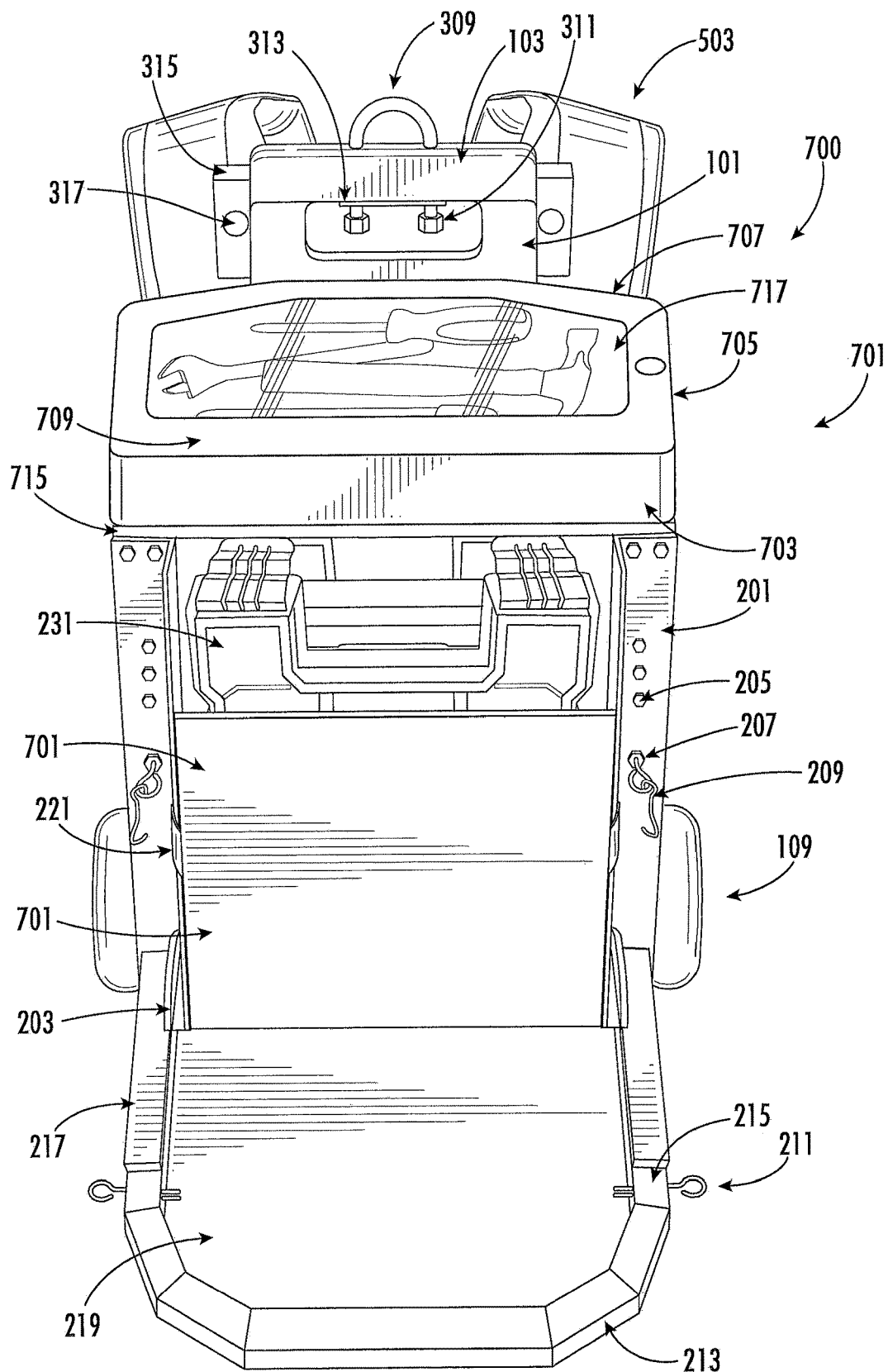
FIGS. 15A and 15B are front views of another alternatives embodiment of the tool cart, according to the present application.
Figure 15B:
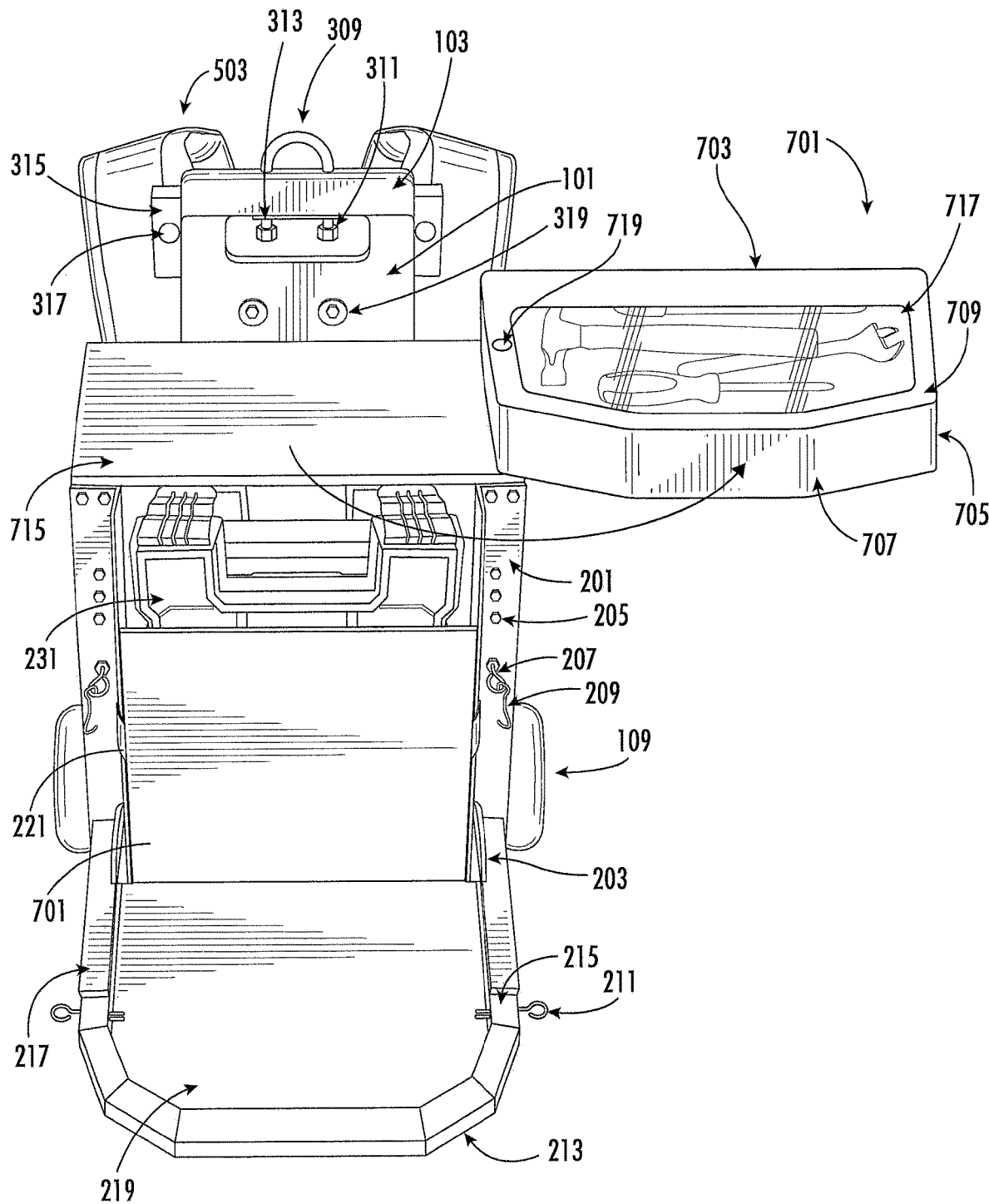

Referring now to FIGS. 15A and 15B in the drawings, a front view of tool cart 100 with another alternative embodiment of carry-on tray 300 is depicted. This alternative carry-on tray 701 is structure similar to carry-on drawer 700 in that is also comprises front wall 703, end walls 705, segmented back wall 707, top portion 709, base 715, and cover 717. Tray 701 differs to drawer 700 in that cover 717 is seen on the top part of tray 701 instead of on the bottom like in drawer 700. Tray 701 also has rotating pin 719 instead of a hinge system like drawer 700. Rotating pin 719 also the user to rotate the tray in and out of position for ease of access to the materials stored there.

Figure 16:
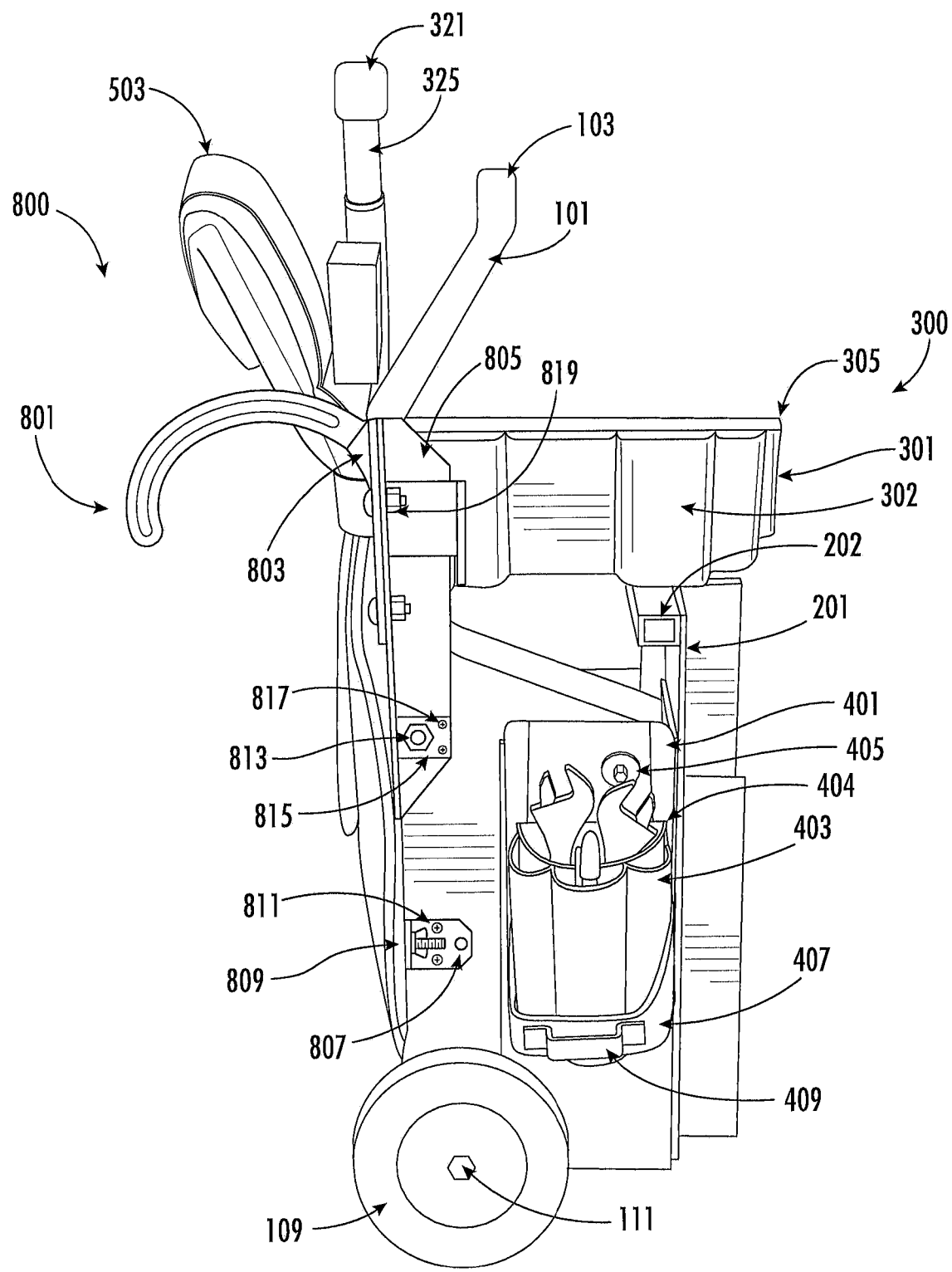
FIG. 16 is a side view of another alternative embodiment of the tool cart, according to the present application.

Referring now to FIG. 16 in the drawings, a side views of an alternative embodiment of tool cart 100 is depicted. FIG. 6 show that the alternative sides of tool cart 100 has retractable ladder hook system 800 which is comprised of retractable ladder hooks 801, hook fastener 803, rotatable hook base 805, lower hook base 807, lower hook base fastener 809, lower hook base screws 811, hook base rotatable fastener 813, attachment base 815, attachment base fasteners 817, and upper hook base 819.

Ladder hook 801 is also found on both sides of tool cart 100 and are used to attach tool cart 100 to a ladder. Ladder hooks 801 are arched shaped and as shown in FIG. 16 in the drawings, extend out towards the back of tool cart 100. Ladder hooks 801 are designed so if the person carrying tool cart 100 up a ladder, or using a rope to lift it up, were to get tired in the process or if they had a muscle spasm and would need to set tool cart 100 down, they could do so by using hooks 801 to rest tool cart 100 on the ladder. Ladder hooks 801 will be most likely used when an individual is carrying up tool cart 100 up a ladder themselves as opposed to when they are hoisting it because of the structure of the hooks getting in the way of hoisting, but these hooks may be used in any situation where tool cart 100 is being taken up a ladder. Retractable ladder hooks 801 provide this service by being able to be flipped up and attach to the rungs of the ladder when this occurs. They provide hooks which allow the user to rest the tool cart 100 on the ladder itself while the user recovers and once the user recovers, ladder hook 801 can be disengaged just by lifting up tool cart 100 as gravity is what secures tool cart 100 to the ladder using hooks 801.

The entire ladder hook system is attached to both sides of arched body 101 by rotatable hook base 805 and retractable ladder hooks 801 are connected to hook base 805 by hook fasteners 803. When rotatable hook base 805 is in the down position it is fastened to lower hook base 807 by lower hook base fastener 809. Lower hook base 807 is L-shaped and one side of it is attached to arched body 101 by lower hook base screws 811. The side of lower hook base 807 that is not attached to arched body 101 is just as long as rotatable hook base 805 and ends in a T shape. Being this length leads to the rotatable hook base 805 being snuggly secured when it is in the down position and fastened to lower hook base 807 which will prevent it from moving while the user is wearing or towing tank carrier 100.

Rotatable hook base 805 may also be rotated into the up position when the user wishes to use ladder hooks 801 by rotating the base around rotatable hook base fastener 813. Fastener 813 will be loosened which will allow the user to rotate base 805 to another position before tightening fastener 813 back and securing the base in the new position. Fastener 813 is also attached to attachment base 815 which is L-shaped and connects to arched body 101 by attachment base fasteners 817. The attachment base 815 is attached to the side and front of arched body 101 which provides more stability in the system. Once rotatable base 805 has been rotated into the up position, upper hook base 819 will be used to secure it to cross bar handles 307.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. A tool cart comprising:
   a tool compartment defined by a pair of opposing end walls, a back wall, a handle portion, and a base;
   a retractable hoist ring positioned within the handle portion;
   a pair of stoppers secured to a pair of ends of the hoist ring, the pair of stoppers being configured to prevent the hoist ring from being pulled out of the handle portion;
   at least one wheel attached to the base of the tool compartment; and
   at least one support strap attached to a back of the back wall;
   wherein the hoist ring is U-shaped with the arched portion extending above the handle portion.

2. The tool cart of claim 1, wherein the tool compartment is formed from a lightweight material.

3. The tool cart of claim 1, wherein the base of the tool compartment is grooved to securely receive at least one tool kit.

4. The tool cart of claim 1, further comprising:
at least one crossbar handle extending outwardly from a side of the tool compartment.

5. The tool cart of claim 1, further comprising:
a cushion attached to the back of the back wall;
at least one additional support strap attached to the back of the back wall;
a strap buckle housing on the at least one support strap;
a strap buckle insert on the at least one additional support strap, such that the tool cart can be secured to an individual by inserting the buckle insert into the buckle housing; and
at least one tightening grip for adjusting the length of the at least one support strap.

6. The tool cart of claim 1, wherein the at least one support strap is replaceable.

7. The tool cart of claim 1, further comprising:
at least one tool carrier connected on at least one end wall of the pair of opposing end walls.

8. The tool cart of claim 7, wherein the at least one tool carrier comprises:
at least one tool pouch, the at least one tool pouch being configured to receive at least one tool; and
a support strap extending along a bottom of the at least one tool pouch, the support strap being configured to support the weight of at least one tool pouch.

9. The tool cart of claim 1, further comprising:
a retractable dolly connected to a front of the tool compartment.

10. The tool cart of claim 9, the retractable dolly comprising:
a base;
a segmented front wall extending up from the base;
a pair of opposing end walls extending up from the base, the pair of opposing end walls further being configured to connect to the segmented front wall to enclose the base;
at least one pair of hinges connecting the pair of end walls to the tool compartment, the at least one pair of hinges being configured to rotate the retractable dolly between an upright and lowered position; and
at least one dolly tab extending outwardly from at least one of the pair of end walls, the at least one dolly tab being configured to receive a fastener tab on the tool compartment to secure the retractable dolly in the upright position.

11. The tool cart of claim 1, further comprising:
a slide out dolly, comprising:
a base;
a segmented front wall extending up from the base; and
a pair of opposing end walls extending up from the base, the pair of opposing end walls further connecting to the segmented front wall to enclose the base; and
a slide out storage compartment disposed within the tool compartment, the slide out storage compartment being configured to receive the slide out dolly.

12. The tool cart of claim 1, further comprising:
a retractable tow handle positioned behind the handle portion, the retractable tow handle comprising:
a tow handle;
at least one telescopic tow bar extending down from the tow handle, the at least one telescopic tow bar being configured to extend up from the back wall;
at least one bar storage connected to the back wall, the at least one bar storage being configured to store the at least one telescopic tow bar; and
a handle release disposed on the tow handle, the handle release being configured to release and extend the at least one telescopic tow bar from the at least one bar storage.

13. The tool cart of claim 1, further comprising:
a carry-on tray storage tray.

14. The tool cart of claim 13, the carry-on storage tray comprising:
a base;
a front wall extending up from a front of the base;
a pair of side walls extending up from opposing sides of the base, the pair of side walls being configured to connect to the front wall; and
at least one protrusion extending outwardly from the front wall or the pair of side walls, the at least one protrusion increasing the surface area of the base.

15. The tool cart of claim 1, further comprising:
a carry-on storage drawer.

16. The tool cart of claim 15, the carry-on storage drawer comprising:
a base;
a compartment formed by a pair of end walls, a front wall, a segmented back wall, and a top portion;
a hinge connecting the compartment to the base, the hinge being configured to allow compartment to rotate relative to the base; and
a handle extending up from the top portion.

17. The tool cart of claim 1, further comprising:
at least one retractable ladder hook connected to the back wall, the at least one retractable ladder hook being configured to rotate up for attachment onto a ladder rung.

18. The tool cart of claim 1, further comprising:
at least one security strap fastened to a front of the back wall;
at least one additional security strap fastened to the front of the back wall;
a strap buckle housing on the at least one security strap; and
a strap buckle insert on the at least one additional security strap, such that a tool kit can be secured within the tool compartment by inserting the buckle insert into the buckle housing.

* * * * *